(12) United States Patent
Willard et al.

(10) Patent No.: US 8,229,693 B2
(45) Date of Patent: Jul. 24, 2012

(54) CALIBRATION TOOL

(75) Inventors: Alexander Edward Willard, Kelvedon (GB); Emmanouil Hatiris, Kelvedon (GB)

(73) Assignee: Lysanda Limited, Kelvedon, Essex (GB)

( * ) Notice: Subject to any disclaimer, the term of this patent is extended or adjusted under 35 U.S.C. 154(b) by 360 days.

(21) Appl. No.: 12/530,229

(22) PCT Filed: Mar. 6, 2008

(86) PCT No.: PCT/GB2008/000806
§ 371 (c)(1),
(2), (4) Date: Sep. 8, 2009

(87) PCT Pub. No.: WO2008/107692
PCT Pub. Date: Sep. 12, 2008

(65) Prior Publication Data
US 2010/0023292 A1 Jan. 28, 2010

(30) Foreign Application Priority Data

Mar. 6, 2007 (GB) .................................. 0704377.1

(51) Int. Cl.
*G01D 18/00* (2006.01)
(52) U.S. Cl. ........................ 702/85; 702/182; 702/183
(58) Field of Classification Search .................. 702/85, 702/89, 182
See application file for complete search history.

(56) References Cited

U.S. PATENT DOCUMENTS

| | | | |
|---|---|---|---|
| 4,128,005 A * | 12/1978 | Arnston et al. | 73/114.65 |
| 4,817,418 A * | 4/1989 | Asami et al. | 73/114.77 |
| 4,989,146 A * | 1/1991 | Imajo | 701/31.5 |
| 5,038,289 A * | 8/1991 | Abe | 701/99 |
| 5,400,018 A * | 3/1995 | Scholl et al. | 340/10.3 |
| 5,431,042 A | 7/1995 | Lambert et al. | |
| 5,481,906 A * | 1/1996 | Nagayoshi et al. | 73/114.61 |
| 5,781,700 A | 7/1998 | Puskorius et al. | |
| 6,256,594 B1 * | 7/2001 | Yamamoto et al. | 702/185 |
| 2003/0216889 A1 * | 11/2003 | Marko et al. | 702/182 |
| 2006/0116811 A1 * | 6/2006 | Willard | 701/109 |
| 2011/0251816 A1 * | 10/2011 | Tracey | 702/96 |

FOREIGN PATENT DOCUMENTS

GB 2410560 8/2005

* cited by examiner

*Primary Examiner* — Drew A Dunn
*Assistant Examiner* — Mischita Henson
(74) *Attorney, Agent, or Firm* — Crawford Maunu PLLC

(57) ABSTRACT

The invention provides a calibration tool for a vehicle monitoring device, the tool having a processor with a clock or access to a time signal and arranged for connection to and to receive and process signals from a vehicle on-board diagnostics unit (OBD), the processor having or connected to means for storing data relating to the vehicle and its engine and codes relating to signals from the available OBD outputs and inputs, the processor being programmed to calculate and store certain coefficients derived over the vehicle's operating range and to populate an array with the said coefficients so that the processor can look up the corresponding co-efficient from the array to calculate the desired value or output. The invention extends to a method of calibrating a calibration tool or a vehicle-monitoring device mounted in a vehicle provided with such a calibration tool. The method comprises the steps of configuring the calibration tool to receive data from vehicle sensors including those indicating vehicle road and engine speed data and temperature data, operating the vehicle, processing the data received during operation of the vehicle to calculate coefficients specific to the vehicle, and populating look-up tables that are accessible to the vehicle monitoring device with the calculated coefficients.

8 Claims, 4 Drawing Sheets

CALIBRATION TOOL

The invention relates to a method of calibrating a vehicle-monitoring device and a calibration tool for use in such a method. The calibration tool calibrates a vehicle-monitoring device to allow the device to provide vehicle-specific data.

BACKGROUND

When a road vehicle is equipped with a vehicle monitoring device, which is capable of outputting and/or displaying vehicle operating parameters, such as fuel economy, exhaust emissions, or engine load, the device needs to be calibrated to reflect the specific characteristics of the vehicle to which it is attached over its operating ranges, both under load and in various climatic conditions. The device may additionally need to be recalibrated on an on-going basis to reflect its load or the operating conditions or characteristics of the vehicle.

The vehicle monitoring device may be programmed to be able to output the exhaust tailpipe emissions of the vehicle, for example to ensure compliance with regulations. It will also need to be calibrated for these outputs to be reliable.

In principle this could be achieved by providing a large number of data inputs to the device or by laboratory testing of each vehicle but these processes would be impracticable and expensive.

STATEMENT OF INVENTION

The invention provides a calibration tool for a vehicle monitoring device, the tool having a processor with a clock or access to a time signal and arranged for connection to and to receive and process signals from a vehicle on-board diagnostics unit (OBD) as defined, the processor having or connected to means for storing data relating to the vehicle and its engine and codes relating to signals from the available OBD outputs and inputs, the processor being programmed to calculate and store certain coefficients derived over the vehicle's operating range and to populate an array with the said coefficients so that the processor can look up the corresponding co-efficient from the array to calculate the desired value or output.

The calibration tool and/or the vehicle monitoring device use data available via the On-Board Diagnostics system (EOBD or OBD2) to derive engine specific outputs and coefficients. While OBD is the preferred method of obtaining input data, it is possible to obtain similar parameters from other commonly used vehicle based data systems including the Controller Area Network (CAN) and other data bus systems such as LIN, MOST and FLEXR. Therefore throughout this specification the term OBD or On-board Diagnostics port as defined is intended to include other outputs which will supply equivalent or similar data, and the text should be read accordingly throughout.

The calibration tool may be provided separately and connected to the vehicle monitoring device, comprise a part of the vehicle monitoring device, or the necessary steps may be programmed into one or more processors within the vehicle monitoring device and the coefficients stored in appropriate rewritable memory associated with the vehicle monitoring device or separately from it. Or it may comprise computer code or software.

The invention extends to a method of calibrating a calibration tool or a vehicle-monitoring device mounted in a vehicle provided with such a calibration tool. The method comprises the steps of configuring the calibration tool to receive data from vehicle sensors including those indicating vehicle road and engine speed data and temperature data, operating the vehicle, processing the data received during operation of the vehicle to calculate coefficients specific to the vehicle, and populating look-up tables that are accessible to the vehicle monitoring device with the calculated coefficients.

It will normally be necessary to preload some vehicle-specific 'hard data'. This hard data may relate to physical, measurable properties, including some or all of the following:
  Aerodynamic cross sectional area
  Aerodynamic drag factor ($C_D$)
  Catalyst properties
  Engine and gearbox data
  Mass and weight distribution of the vehicle
  Emissions related components (EGR valve(s), throttle(s), exhaust injector(s))
  Inertia and mass of rotating parts
  Air-charging system data (e.g. for supercharging or turbo-charging components)
  Losses of accessories (e.g. alternator, air conditioning).
  OBD codes and scales.

Often the calibration tool or the vehicle monitoring device can retrieve some or all of this data directly from the OBD. Equally, a range of vehicle properties for a specific group of vehicles may be pre-loaded on the calibration tool.

It may also be useful to include data and coefficients derived from similar vehicles and drive trains so that these coefficients can be used as a starting point for generating the new engine-specific coefficients.

The calibration tool may populate more than one look-up table or data matrix and may calculate sets or arrays of coefficients and write these sets to the look-up table or a plurality of look-up tables. In general it will be necessary to input certain 'hard data' relating to the vehicle frontal area, drag coefficient, mass, etc. as referred to above and to drive the vehicle over a minimum predetermined cycle to determine the initial calibration. Such a drive cycle will involve an acceleration stage and an over-run stage. Coasting and constant speed stages will improve the accuracy of the coefficients. Where more relevant data, such as fuel demand or mass air flow, becomes available from the OBD the resulting more precise coefficients may be used to replace those obtained from the more empirical drive cycle.

The method may be particularly useful in conjunction with a vehicle monitoring device that monitors an aspect of the vehicle in real time; for instance the vehicle monitoring device may be a device for monitoring fuel economy and/or a device for monitoring vehicle emissions and/or a device for monitoring engine load.

The data collected and processed by the calibration tool may be collected directly from sensors on the vehicle. However, it is preferred that the data should be collected from sensors on the vehicle via an on-board diagnostics (OBD) system or equivalent communications system. An OBD system, for instance OBD-1, OBD-2 or E-OBD is a diagnostic system that accesses signals from various vehicle sensors and systems. It is therefore possible to receive data from a number of different sensors and systems distributed throughout the vehicle via a single connection to an OBD system. Data may also be collected via an OBD-equivalent system including any standardised communications system present on the vehicle, for example, the J1939 standard for trucks.

The tool may collect some data via an OBD system and some data directly from other sensors mounted appropriately on the vehicle. This may be advantageous in the situation where a particular set of vehicle data is not accessible via the vehicle's OBD system or communications system.

The calibration tool may receive data from any vehicle sensor or system, particularly from sensors monitoring fuel flow rate, mass air flow rate, exhaust temperature, external air temperature, inlet manifold pressure, and/or throttle position. The tool also requires a timing signal or should be capable of generating its own.

Different systems may make use of different data elements to measure similar parameters. For example, in order to monitor air mass flow rate through the engine, a system may use air mass flow sensors, or measure volume flow rate (and then estimate density using pressure and temperature information, and thereby acquire air mass flow), or use sensed manifold pressures and measured engine speeds to predict the air flow.

Thus, when a particular parameter is required, it is preferable that the tool can utilise whatever data elements are provided by the vehicle system in order to obtain that parameter.

Preferably, the tool receives data relating to the following set of parameters in order to generate the required coefficient or array of coefficients. It may use one or more strategies to generate accurate outputs and to calculate vehicle-specific coefficients which can be used to calculate the desired (predicted) outputs when some of the inputs are not available. The following strategies are followed sequentially in preference order. For example if Strategy 1 is not available, Strategy 2 is followed, and so on:

Strategy 1.
  Fuel demand
Strategy 2.
  Air temperature
  Air flow rate into the engine
  Inlet manifold pressure
  Inlet air temperature
Strategy 3.
  Engine speed
  Vehicle speed
  Engine temperature (coolant and/or oil)

Strategy 1 naturally provides the most accurate indication of fuel consumption and the most accurate coefficients, but may not be readily available or be too delayed to be of much use. Strategy 2 is more usually available and produced good results from the calculated air mass flow. Strategy 3 produces good results when combined with the drive cycle initiation, and can often be refined by comparing the coefficients with those from Strategy 2 when they are available. It should be noted that the inputs for Strategy 3 have the advantage that they are always available without delay. It is the use of the vehicle-specific coefficients stored in the array or look-up tables that permits the calculation of fuel and other desired predicted outputs using the inputs of Strategy 3 that is the essence of the invention.

In order to derive the required coefficients, the calibration tool may prompt a user of the vehicle to operate the vehicle according to steps of a pre-determined test cycle. This may advantageously allow the look-up tables with the coefficients to be accessed by the vehicle monitoring device to be populated more efficiently. As an example, the vehicle operator may be prompted to start the engine from a cold condition and then drive the vehicle. The operator may then be prompted to drive according a pre-defined set of engine/vehicle operating conditions, e.g. maintaining various different steady speeds, accelerations through all gears, coasting in all gears, and to slow down in an over-run condition with no accelerator, closing the throttle completely.

In the case where the calibration tool prompts the operator to perform a pre-determined test cycle, the calibration tool may advantageously assess data received in each step of the test cycle and, if the data is sufficient, prompt the operator to move on to the next step, or if the data is insufficient, prompt the operator to repeat the previous step.

It is not essential to use predetermined test cycles and thus the calibration tool may automatically populate the look-up tables (look-up tables may be referred to as data matrices or arrays) with the required coefficients to calibrate the vehicle-monitoring device when the operator of the vehicle drives normally on the roads.

To achieve this the calibration system may be programmed to recognise various operating conditions of the vehicle such as driving at steady speed, accelerating, braking and starting from cold, and to evaluate coefficients for the look-up tables when it recognises such operating conditions during normal use of the vehicle. In addition to recognising certain operating conditions it may also be programmed to measure parameters of those conditions such as how rapidly the vehicle is accelerating, slowing down or braking.

The data received from the vehicle sensors by the calibration tool is processed by performing various calculations on the data to calculate coefficients, or sets of coefficients, specific to the vehicle (i.e. rather than generic to the type of vehicle or vehicle class; the vehicle monitoring device may already have access to generic data representative of the type of vehicle in existing look-up tables). From these calculations, the tool populates a series of look-up tables which characterise the relationship between, for example, the fuel used and work done, or represent operating load and power drain or drive line losses. The tables may also characterise energy lost to heat in the engine and under-bonnet surroundings, or as heat within the exhaust gases.

The vehicle-specific coefficients, or sets of coefficients, may advantageously include at least one of the following:
  a coefficient describing the losses in converting rotational energy from the vehicle crankshaft to forward motion in the vehicle,
  a coefficient describing the conversion of chemical energy into rotational energy at the crankshaft,
  a coefficient for describing the work done by the engine to gather intake air and trap it in the cylinder for combustion,
  a coefficient describing the work done by the engine to force exhaust gases into the atmosphere through the exhaust,
  a coefficient to enable estimation of the exhaust gas temperature from fuel injected,
  a coefficient to enable estimation of the torque produced from the fuel injected,
  a coefficient to enable estimation of the exhaust gas composition from fuel/air/EGR quantities in the combustion process, and
  a coefficient to enable estimation of the chemical reaction rates within the catalyst(s) from exhaust gas compositions and temperatures.

Thus, for example, the tool may populate a look-up table with a set of coefficients that describe the conversion of chemical energy into rotational energy at the crankshaft, or it may populate a plurality of look-up tables with sets of coefficients describing the losses in converting rotational energy from the vehicle crankshaft to forward motion in the vehicle, the work done by the engine to gather intake air and trap it in the cylinder for combustion, the work done by the engine to force exhaust gases into the atmosphere through the exhaust and enabling estimation of the exhaust gas temperature from fuel injected.

If filter or adsorber elements are fitted, the vehicle-specific coefficients may also include coefficients to describe trapping efficiencies and combustion rates within filter or adsorber elements of the after-treatment system.

The tool may populate a table or a plurality of look-up tables with any of, or all of, the vehicle specific coefficients described above, or sets of any of or all of the vehicle specific coefficients described above.

The tool may continue to overwrite an existing look-up table as operating conditions change or as the vehicle grows older.

In a further aspect the invention may provide a calibration tool for calibrating a vehicle monitoring device comprising, means for obtaining data relating to fuel consumption, vehicle road speed, and engine speed from a plurality of vehicle sensors, means for processing the obtained data to provide vehicle-specific coefficients, and means for transferring the coefficients to a look-up table accessible to the vehicle monitoring device.

The calibration tool may itself be embodied in software. In this case it may exist as a programme within a vehicle monitoring device, or downloadable to a vehicle monitoring device. It may then be executed by the controller or microprocessor of the vehicle-monitoring device. Alternatively, the software may be operated on another processor carried by the vehicle, such as within the vehicle's engine management system.

The means for obtaining data may be a routine that selects specific data for use in the calibration from a stream of data fed to the device or received by the device. The data may be stored, either in volatile or non-volatile memory, or may be directly processed.

The means for processing the obtained data may be an algorithm or algorithms that process the raw data received from the sensors (or from the sensors via an OBD system or equivalent) to produce coefficients or sets of coefficients. Again, the coefficients may be stored or they may be directly transferred and written to the look-up tables.

The means for transferring the coefficients to a look-up table may be any suitable routine for transferring the coefficients and writing them into the look-up table.

There may be other software implemented steps, for example, prompting an operator to complete a number of pre-determined vehicle driving steps in order to populate the look-up tables more efficiently.

When embodied in software, the calibration tool may be stored in flash or other memory, or on a disc, for example a floppy disk or a CD-ROM, or it may be stored on a hard drive and be accessible by downloading via the Internet.

The calibration tool can, alternatively, be embodied in hardware and have its own processor, memory, clock and electrical circuitry including physical input and output ports.

If embodied in hardware the tool may have an input for receiving vehicle sensor data, a processing means for processing input data and an output for routing processed data to a look-up table.

In a further aspect the invention may also provide a vehicle-monitoring device comprising a calibration tool as defined above or a vehicle monitoring device couplable to/programmable with a calibration tool as defined above.

A calibration tool according to the invention may be used to populate data tables for use in vehicle simulation programs such as GT-SUITE and Ricardo WAVE.

SPECIFIC EMBODIMENTS

The invention will now be described by way of example with reference to the accompanying diagrams, in which.

Figure 1:
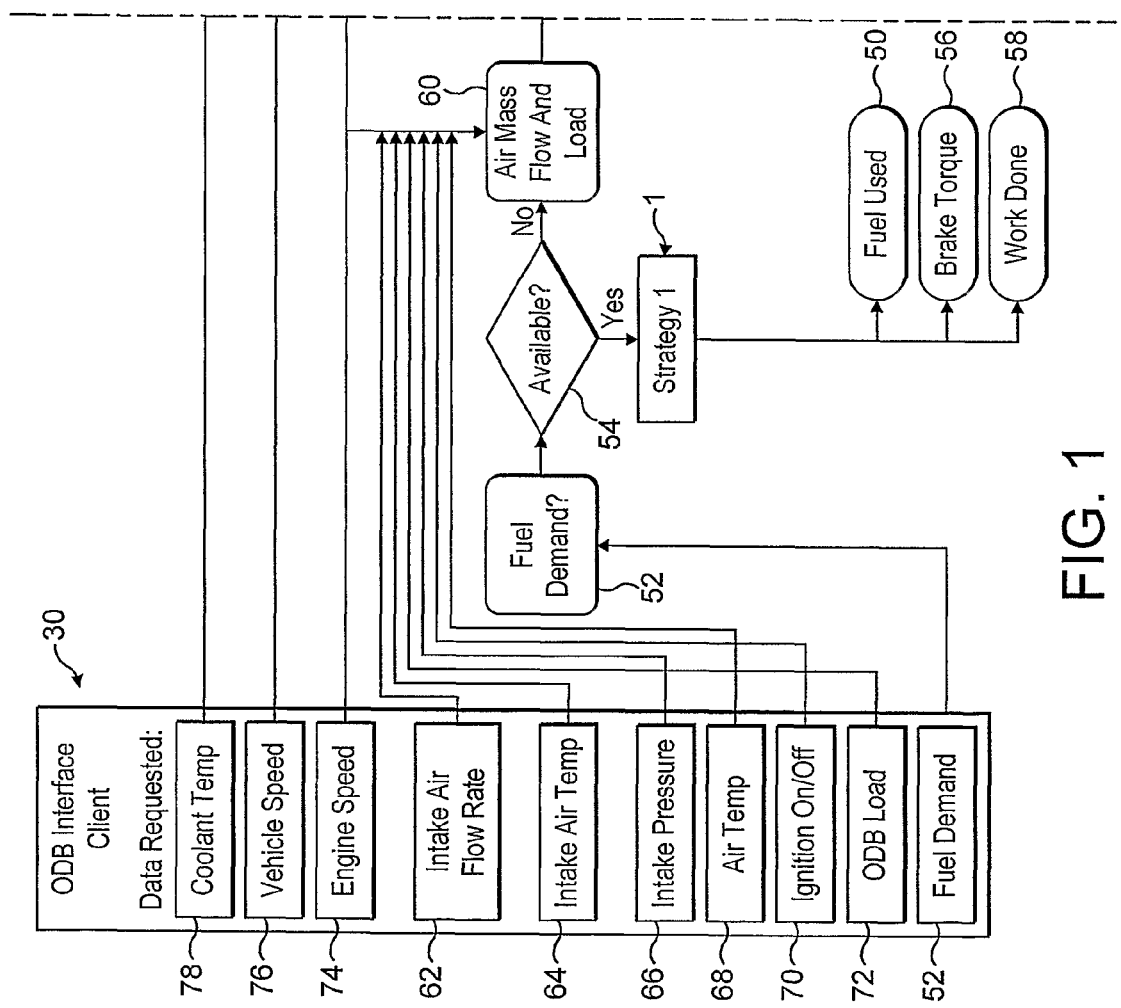
FIG. 1 represents a schematic flow chart showing a calibration tool in accordance with the invention in a typical arrangement with a vehicle monitoring device.
Figure 1:
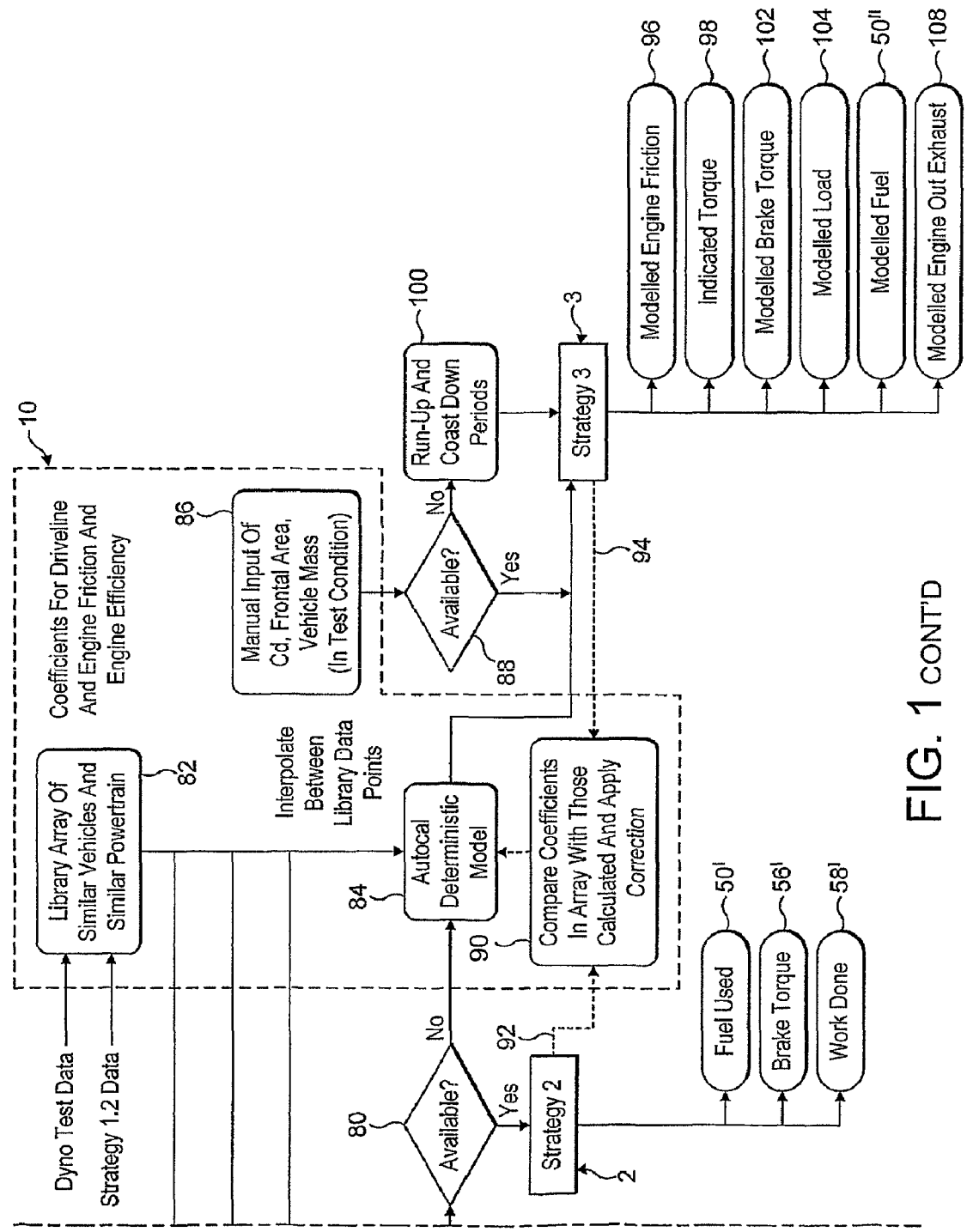

Referring to FIG. 1, the diagram shows a calibration tool 10 associated with a vehicle monitoring device (VMD) 20 connected to an On-board Diagnostics port (OBD) 30 as defined, which supplies various outputs which can be accessed by the calibration tool 10 and the VMD 20.

The calibration tool and/or the vehicle monitoring device use data available via the On-Board Diagnostics system (EOBD or OBD2) to derive engine specific outputs and coefficients. While OBD is the preferred method of obtaining input data, it is possible to obtain similar parameters from other commonly used vehicle based data systems including the Controller Area Network (CAN) and other data bus systems such as LIN, MOST and FLEXR. Therefore throughout this specification the term OBD or On-board Diagnostics port is intended to include other outputs which will supply equivalent or similar data, and the text should be read accordingly.

The VMD 20 is programmed to follow three successive strategies depending on the information available from the OBD 30, to obtain an accurate measure or predicted value of instantaneous and cumulative fuel used 50.

Where a fuel demand signal 52 is available from the OBD without a delay at gate 54, Strategy 1 (Box 1) can be used to obtain an accurate indication of fuel used at 50. This may be displayed as an instantaneous or cumulative value (not shown). Other parameters, such as brake torque 56 and work done 58 may also be calculated to be displayed or used elsewhere in the VMD 20 or in the vehicle.

If the fuel demand signal 52 is delayed or not available, the fuel used signal 50' is obtained using Strategy 2 (Box 2) using the air mass flow which provides a close approximation to the fuel demand. The air mass flow is calculated by the air mass flow and load unit 60 from the received intake air flow rate 62, inlet air temperature 64, intake pressure 66, air temperature 68, ignition on/off 70, OBD load 72 and engine speed 74 parameters. If these signals are all available without a delay, gate 80 adopts Strategy 2 (Box 2) whereby the fuel used 50', brake torque 56' and work done 58' can be obtained from the mass airflow and load unit 60. Vehicle-specific coefficients are calculated and sent to a memory and compare unit 90 where they are stored for future use and calibration.

If any of the necessary parameters are not available or are delayed at the gate 80, Strategy 3 (Box 3) must be adopted, using the calibration tool 10. The advantage of Strategy 3 is that all the data inputs are always available from the OBD or the vehicle. The calibration tool includes a library array or look-up table 82 which holds data relating to the vehicle or information obtained from other similar vehicles and power trains. The calibration processor 84 is arranged to interrogate the library array 82 to obtain coefficients for drive line and engine friction and engine efficiency. The calibration unit 84 then interrogates the OBD 10 to obtain engine speed 74, vehicle speed 76 and coolant temperature 78. Using its clock it calculates acceleration and engine loads. It seeks the required coefficients from the memory and compare unit 90 and proceeds to perform Strategy 3 (Box 3).

Additional 'hard data' relating to the vehicle frontal area, drag coefficient CD, vehicle mass, and certain engine parameters are obtained from a manual input database 86. The Box 3 sends coefficients to the array or look up tables in the memory unit 90 via connection 92. If the hard data is not available from the database 86, Box 3 prompts the driver to perform a series or run-up and coast down sessions to model the data (as described in more detail below with reference to FIG. 3). The output from Box 3 provides modelled outputs representing fuel used 50", engine friction 96, indicated torque 98, brake torque 102, load 104 and optionally emissions 108. It also sends the coefficients used to the memory and compare unit 90 via line 94.

If enabled, this feature allows the calibration tool continuously to recalculate the coefficients while the vehicle is being driven normally to update the memory unit 90 and compare the coefficients in real time with those obtained from time to time from the better information used under Strategy 2. Once the memory unit contains a sufficient array of vehicle-specific coefficients the vehicle monitoring device can produce accurate calculated or predicted values of fuel used and other outputs from the three reliable inputs: engine speed 74, vehicle speed 76 and coolant temperature without having to interrogate the OBD for more exotic information which may not always be available.

It should be noted that in describing the various steps, functions and items with respect to the flow chart in FIG. 1 the various items may be separate electronic devices, integrated circuits incorporating one or more functions or other circuits designed to perform the function described.

Figure 2A:
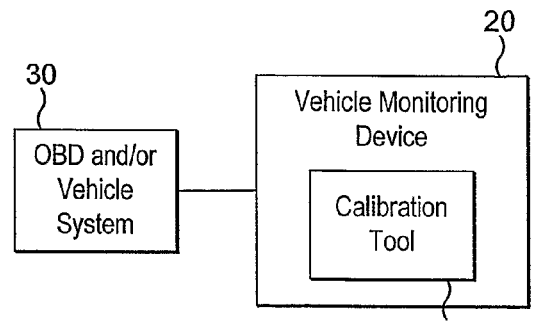
FIG. 2 is a schematic diagram illustrating a number of different ways in which a calibration tool in accordance with the invention can be linked to a vehicle monitoring device for calibration.

FIG. 2a shows the calibration tool 10 incorporated in a vehicle monitoring device 20 connected to an OBD 30, for determining emissions produced by a vehicle. The emissions-determining device 20, couples directly to the OBD 30 in the vehicle thereby receiving data from various vehicle sensors and systems. The calibration tool within the emissions unit is in communication with a remote controller (not shown), which enables the tool to be switched or configured to receive data from vehicle sensors.

In use, the calibration tool is configured to receive data via the OBD from vehicle sensors which either directly constitute fuel consumption, vehicle road speed, and engine speed data or enable these parameters to be calculated or estimated. Data from the vehicle sensors is processed to obtain coefficients or sets of coefficients relating to sources of energy loss or torque production capability by the vehicle in question. The calibration tool is pre-programmed with various constant and static data relating to the specific vehicle model and is able to use these constant data, where necessary, in calculations. These data are provided in an internal table. Data in this internal table may be entered by a user or operator, and may be requested during set-up.

Figure 3:
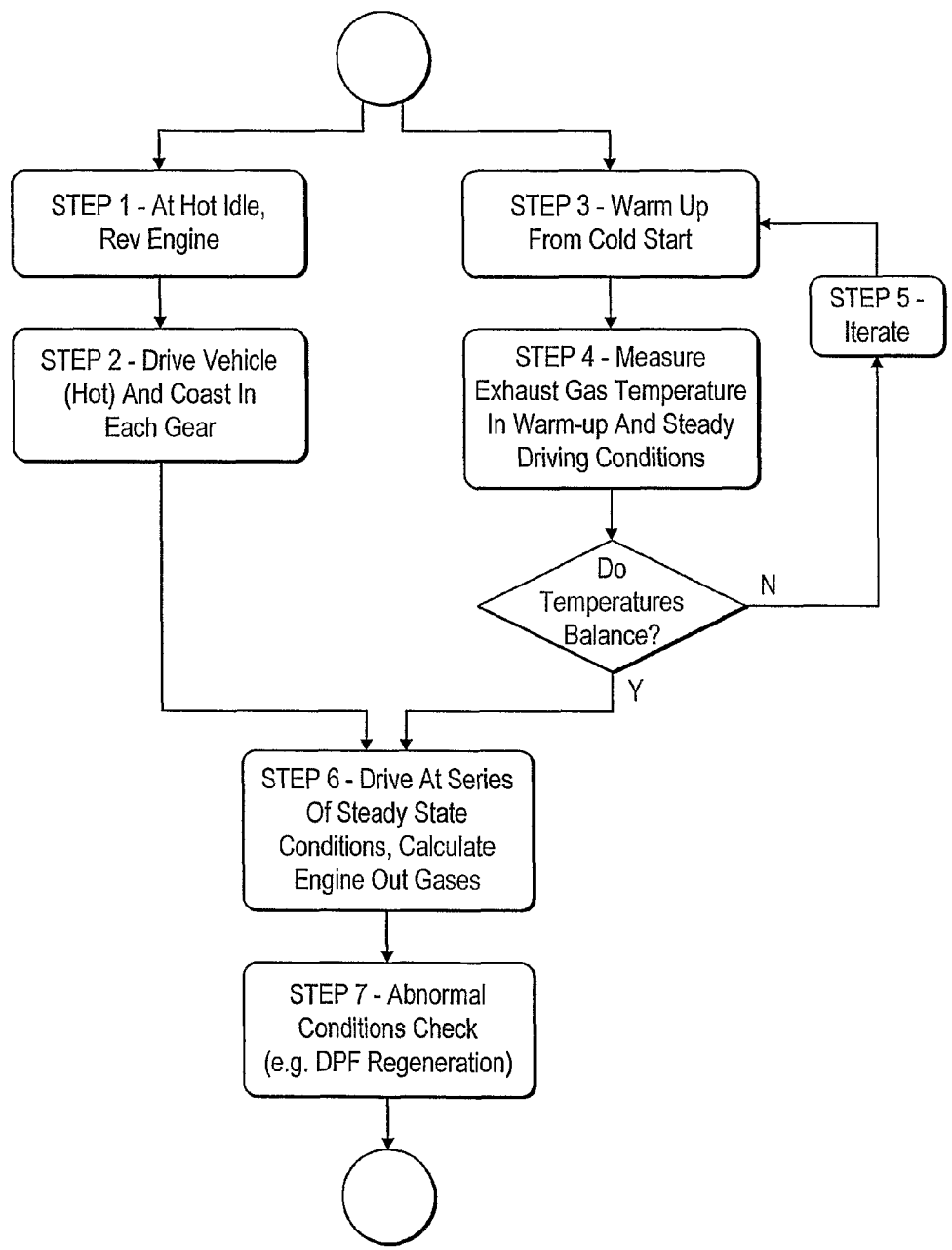
FIG. 3 is a flow chart illustrating a calibration method for use with a calibration tool in accordance with the invention, where a vehicle operator carries out a number of predetermined actions.

A user of the vehicle is prompted, via the remote controller, to perform a series of predetermined drive conditions. FIG. 3 is a flow chart illustrating steps in performing a calibration after the calibration tool has been configured to perform a calibration. Both the drive tests that an operator is prompted to take and the type of calculations performed by the tool are as follows.

Step 1.

The operator is prompted to rev (i.e. increase the engine speed of) the engine from hot idle. The calibration tool records data relating to the engine rpm (revolutions per minute) and the amount of fuel injected into the engine. This data is then processed to obtain rate of change of rpm, and the engine inertia is calculated from torque balance equations.

The engine friction losses are then calculated by comparing rising revs and falling revs as the operator depresses and raises the accelerator pedal.

Step 2.

The operator is prompted to drive the vehicle and coast down to slow speeds in each gear. The tool records data relating to engine rpm and vehicle speed in each case. This data is processed to obtain the vehicle deceleration in each gear, and vehicle losses/inertias are calculated by comparing each gear ratio. The engine friction losses and engine inertia obtained in Step 1 are used in this calculation. Vehicle losses due to gearbox and tyre rolling friction are consolidated into a single term.

Step 3.

The operator is prompted to perform an engine warm up from cold start. The tool records data relating to the fuel used, coolant temperatures and oil temperatures during this process. The engine mass is obtained from the internal table and the cooling system design for the vehicle model is checked (e.g. is the thermostat a top hose or bottom hose thermostat). Received data is then processed, along with the model specific data obtained from internal tables, to estimate the energy from fuel that is turned into heat in the engine and passed then to the engine's surroundings. An initial approximation for the heat lost to the exhaust is generated (this is be refined and iterated later in the procedure to obtain a more correct value).

Once the engine is stable at a normal hot temperature, the fuel energy lost in heat all goes to surroundings. The heat loss coefficients are calculated at this stage. During the warm-up, heat goes into the engine and the exhaust first, and therefore an approximate specific heat capacity for engine can be calculated, from the rate of energy (fuel) input and rate of temperature rise of the engine.

Step 4.

The tool receives data relating to the exhaust temperature—either via the OBD system, or via an additional sensor (e.g. a thermocouple can be attached to the exhaust pipe if there is no exhaust temperature data via the vehicle's OBD system). The heat lost from the fuel energy into exhaust energy is then balanced (taking into account, if necessary, the energy lost to a turbocharger in order to accelerate it to working velocity). The thermal capacity of the gases is known and available via an internal table and the airflow rate is also known (from OBD data), so the thermal energy lost out of the tailpipe to the atmosphere can be estimated. The mass of the catalyst and exhaust are known from physical measurements and manufacturer's data.

The data is processed to balance the heat from the fuel lost to the exhaust system and from the various sources of heat loss from the exhaust system to produce an estimate of exhaust gas temperature at each operating condition. This data may be stored in tables or used within a heat balance model to obtain an estimate of exhaust gas temperature.

Step 5.

Steps 3 and 4 are iterated to obtain a consistent set of temperature and heat capacity estimates, which balance and match the temperatures measured on the vehicle.

Step 6.

At this stage we know the fuel, air and EGR mix entering the combustion chamber (from OBD data) and the torque produced (from frictional losses and engine/vehicle accelerations calculated in Step 2 and/or from OBD data). We also know exhaust gas temperature and pressure (measured/estimated in Step 4). From the gas ratios in the combustion process, the combustion products from the engine are estimated. The exhaust gas concentrations will be related to exhaust temperature (e.g. higher combustion temperatures lead to higher NOx and also higher exhaust temperatures).

The operator is prompted to drive at a series of steady state conditions over the full range of speeds/loads/gears to capture data at all conditions.

The OBD system communications system is then used to intrusively command different conditions (e.g. EGR turned off) and the resulting effects on the torques and gas temperatures are monitored. This check is used to ensure that the estimate matches the engine.

Step 7.

Once the standard set of likely exhaust gas constituents and temperatures are known, a check is carried out for abnormal conditions e.g. when intrusive diagnostic tests are taking place or when the DPF (or NOx trap) is being regenerated.

To do this, it may be necessary to invoke a regeneration/diagnostic event and record the resulting effects on the engine/exhaust. Invoking an event is done by using a service tool and service test procedure. This data is then used so that the on-board system can detect when such an event takes place in the future. The values recorded will depend on the type of test being undertaken (e.g. DPF regeneration requires an increase in exhaust temperature, while NOx trap regeneration requires a change in exhaust gas composition).

This process allows the coefficients for estimating exhaust temperatures to be extended to cover these abnormal conditions. The vehicle monitor is calibrated to recognise these events and stores the abnormal set of input conditions for each type of event. The input conditions may be a change to the normal position of EGR valve(s) or throttle(s) or turbocharger(s) or other devices connected to the engine.

Figure 2B:
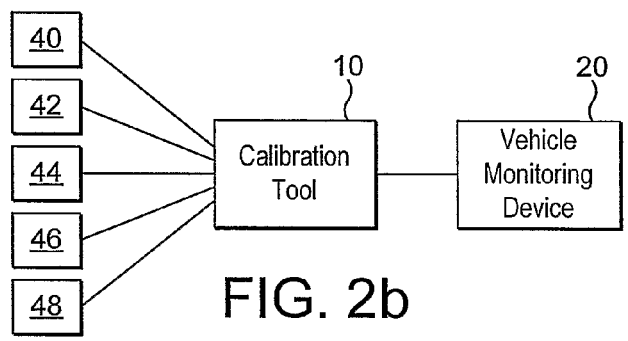
Figure 2C:
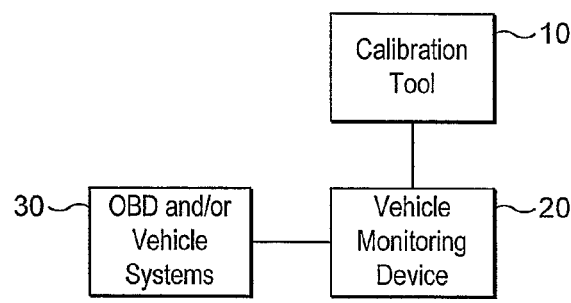
Figure 2D:
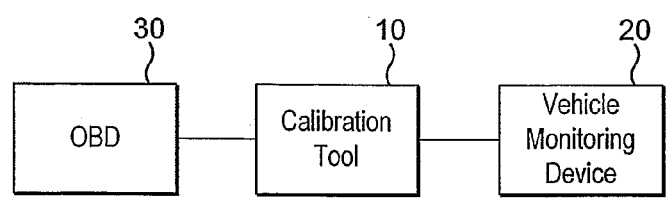

Some alternative configurations for linking a calibration tool to a vehicle monitor are shown in FIGS. 2b to 2d. The tool could, for example, be arranged between the vehicle monitoring device and an OBD system as shown in FIG. 2d or it could receive data directly from vehicle sensors (40, 42, 44, 46, and 48) as shown in FIG. 2b.

FIG. 2c illustrates an advantageous configuration in which the calibration tool is attached to a port in the vehicle monitoring device and receives data from the vehicle's sensors via the vehicle monitoring device (and possibly via an OBD system too).

The tool may be embodied as software. In such a case the tool would exist as code saved to a flash memory or eprom, to a hard drive or on a computer readable medium, such as a CD-ROM.

The invention claimed is:

1. A calibration tool for calibrating an on-board vehicle monitoring device, comprising:
   a processor having a clock or access to a time signal, and constructed and arranged for receiving and processing signals representing at least one of engine, power-train and vehicle operating parameters from a vehicle on-board diagnostics (OBD) port or vehicle sensors,
   means for storing hard data relating to the vehicle and its engine and codes identifying the available on-board diagnostics (OBD) port outputs and inputs, and
   wherein the processor includes processor programming for calculating vehicle-specific coefficients over an operating range for the vehicle and to populate an array with the coefficients and enabling the processor or the vehicle monitoring device to look up a corresponding co-efficient from the array when certain values are not available or are delayed so that a desired value or output can be obtained using available inputs or signals;
   wherein the calculated vehicle-specific coefficients include each of the coefficients:
      a coefficient describing the losses in converting rotational energy from the vehicle crankshaft to forward motion in the vehicle,
      a coefficient describing the conversion of chemical energy into rotational energy at the crankshaft,
      a coefficient describing the work done by the engine to gather intake air and trap it in the cylinder for combustion,
      a coefficient describing the work done by the engine to force exhaust gases into the atmosphere through the exhaust,
      a coefficient to describe the exhaust gas temperature from fuel injected,
      a coefficient to describe the torque produced from the fuel injected,
      a coefficient to describe the exhaust gas composition from fuel, air, and EGR quantities in the combustion process, and
      a coefficient to describe the chemical reaction rates within the catalyst(s) from exhaust gas compositions and temperatures.

2. A calibration tool as claimed in claim 1, wherein the processor is arranged to receive signals obtained from the vehicle OBD port and programmed to calculate the coefficients from the signals.

3. A calibration tool as claimed in claim 1, wherein the coefficients are stored with data relating to vehicle speed, engine speed, coolant temperature, and throttle position.

4. A calibration tool as claimed in claim 1, wherein the processor is programmed to prompt an operator to drive the vehicle in a certain way in order to populate the array over the full range of operation or to fill in missing coefficients.

5. A calibration tool as claimed in claim 1, wherein the processor is programmed to calculate coefficients to populate or update the array during normal operation of a vehicle.

6. A vehicle monitoring device including a calibration tool as claimed in claim 1.

7. A vehicle monitoring device including a calibration tool as claimed in claim 1, wherein in order to calculate the desired outputs, the vehicle monitoring device includes programming means to use an arbitration system to identify, check and prioritize data, the arbitration system including:
   determine a fuel demand signal from the OBD port, if the fuel demand signal is not available or is delayed, determine air temperature, air flow rate into the engine, inlet manifold pressure and inlet air temperature from the OBD port, if these are not available or are delayed, extract the required coefficient from the array and calculate the desired output using vehicle speed, engine speed and coolant temperature.

8. A vehicle monitoring device including a calibration tool as claimed in claim 1, wherein the vehicle monitoring device is a device for monitoring at least one of fuel economy, vehicle emissions and engine load.

* * * * *